(12) United States Patent
Ishii et al.

(10) Patent No.: US 12,501,000 B2
(45) Date of Patent: Dec. 16, 2025

(54) DIALOGUE REPLAY METHOD, DIALOGUE REPLAY APPARATUS AND PROGRAM

(71) Applicant: NTT, Inc., Tokyo (JP)

(72) Inventors: Yoko Ishii, Tokyo (JP); Momoko Nakatani, Tokyo (JP)

(73) Assignee: NTT, Inc., Tokyo (JP)

( * ) Notice: Subject to any disclaimer, the term of this patent is extended or adjusted under 35 U.S.C. 154(b) by 204 days.

(21) Appl. No.: 18/558,606

(22) PCT Filed: Jun. 10, 2021

(86) PCT No.: PCT/JP2021/022204
§ 371 (c)(1),
(2) Date: Nov. 2, 2023

(87) PCT Pub. No.: WO2022/259488
PCT Pub. Date: Dec. 15, 2022

(65) Prior Publication Data
US 2024/0244161 A1    Jul. 18, 2024

(51) Int. Cl.
*H04N 7/15* (2006.01)

(52) U.S. Cl.
CPC ................... *H04N 7/155* (2013.01)

(58) Field of Classification Search
CPC .................... H04N 7/155; H04N 7/15
See application file for complete search history.

(56) References Cited

U.S. PATENT DOCUMENTS

| | | | |
|---|---|---|---|
| 10,581,625 B1* | 3/2020 | Pandey | H04N 7/147 |
| 2012/0224021 A1* | 9/2012 | Begeja | H04N 7/155 |
| | | | 348/E7.083 |
| 2017/0111594 A1 | 4/2017 | Ayers et al. | |
| 2018/0331842 A1* | 11/2018 | Faulkner | H04N 7/15 |
| 2019/0354334 A1* | 11/2019 | Billinghurst | G06F 3/013 |
| 2020/0358900 A1* | 11/2020 | Carty | H04N 7/147 |
| 2022/0224957 A1 | 7/2022 | Ono et al. | |

FOREIGN PATENT DOCUMENTS

| | | |
|---|---|---|
| JP | 2012-044390 | 3/2012 |
| JP | 2019-068300 | 4/2019 |
| JP | 2020-198510 | 12/2020 |
| WO | 2016/143759 | 9/2016 |

OTHER PUBLICATIONS

Noriyoshi Kamado et al., "Introduction of noise-robust ASR platform based on HTML5", IPSJ SIG Technical Report, vol. 2015-SLP-108 No. 3, Oct. 30, 2015, pp. 1-6.

* cited by examiner

*Primary Examiner* — Stella L. Woo
(74) *Attorney, Agent, or Firm* — IPUSA, PLLC

(57) ABSTRACT

A computer executes: an extraction procedure of extracting time series data of a feature for each participant in a dialogue from time series data regarding the dialogue, a value of which is changeable according to the train of thought of the participant in the dialogue; a generation procedure of generating display data visualizing the time series data of the feature together with a video of the dialogue in synchronization with a time of the video; and a display procedure of displaying the display data. Accordingly, it is possible to ascertain a train of thought of the participant in the dialogue.

6 Claims, 4 Drawing Sheets

DIALOGUE REPLAY METHOD, DIALOGUE REPLAY APPARATUS AND PROGRAM

TECHNICAL FIELD

The present invention relates to a dialogue replay method, a dialogue replay apparatus and a program.

BACKGROUND ART

An activity called a living lab has been performed in which a wide variety of people including persons who are meeting for the first time gather to have a dialogue and create a service. However, it is not easy to construct a relationship in which persons who are meeting for the first time can have a dialogue in an atmosphere of freedom and to have a better dialogue. It is necessary for the speaker to correctly convey what he or she thinks, and for the listener to understand the thought while making the thought relative to his or her own idea. The participants in the dialogue need to be accustomed to these processes and to have speaking and listening skills.

Given this, there is a way of proceeding with a dialogue to lead into the next dialogue while looking back on the dialogue content to assist how to think.

As a method of looking back on the dialogue content, there is also a technique that has already been disclosed. Non-Patent Literature 1 discloses a technique for automatically writing dialogue contents.

Furthermore, Patent Literature 1 discloses a technique of summarizing a video by weighting various features extracted from the video, setting a feature by a viewer himself or herself, and extracting a video section.

CITATION LIST

Patent Literature

Patent Literature 1: JP 2012-44390 A

Non-Patent Literature

Non-Patent Literature 1: Kamado, Fujimura, Iwase, Aono, Masataki, Yamada, Otsuya, "HTML5-compliant cloud speech recognition platform", Research Report Spoken Language Information Processing (SLP), 2015-SLP-108 (3), pp. 1-6 (2015)

SUMMARY OF INVENTION

Technical Problem

However, in the related art, it is difficult to look back on a train of thought of a participant in a dialogue.

The present invention has been made in view of the above points, and an object thereof is to enable ascertaining of the train of thought of a participant in a dialogue.

Solution to Problem

In order to solve the above problem, a computer executes: an extraction procedure of extracting time series data of a feature for each participant in a dialogue from time series data regarding the dialogue, a value of which is changeable according to a train of thought of the participant in the dialogue; a generation procedure of generating display data visualizing the time series data of the feature together with a video of the dialogue in synchronization with a time of the video; and a display procedure of displaying the display data.

Advantageous Effects of Invention

It is possible to ascertain a train of thought of a participant in a dialogue.

DESCRIPTION OF EMBODIMENTS

Figure 1:
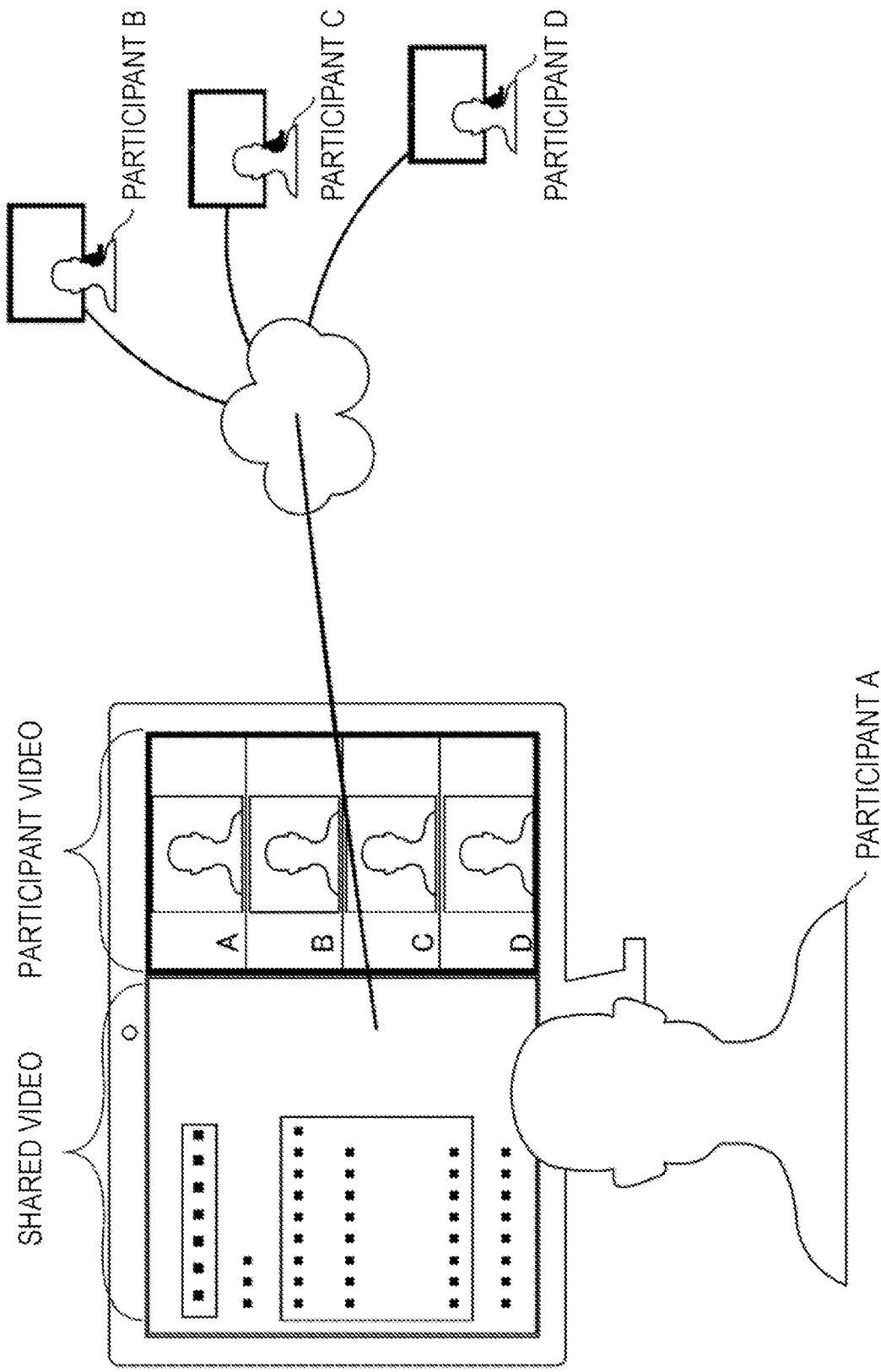
FIG. 1 is a diagram illustrating a state in which participants in a dialogue have a dialogue online.

Hereinafter, embodiments of the present invention will be described with reference to the drawings. FIG. 1 is a diagram illustrating a state in which participants in a dialogue have a dialogue online. A participant in the dialogue (hereinafter, simply referred to as a "participant") has the dialogue online, and a state thereof (a video (a shared video and a participant video in FIG. 3) and an audio) is stored by using a recording function or the like of a video conference system. Alternatively, a video acquired by screen capture may be stored, and an audio may be stored by a predetermined recording function. A dialogue replay apparatus 10 according to the present embodiment executes processing for assisting look-back replay of a stored video. Note that a terminal used by each participant in an online dialogue may be used as the dialogue replay apparatus 10, or a device different from the terminal may be used as the dialogue replay apparatus 10.

Figure 2:
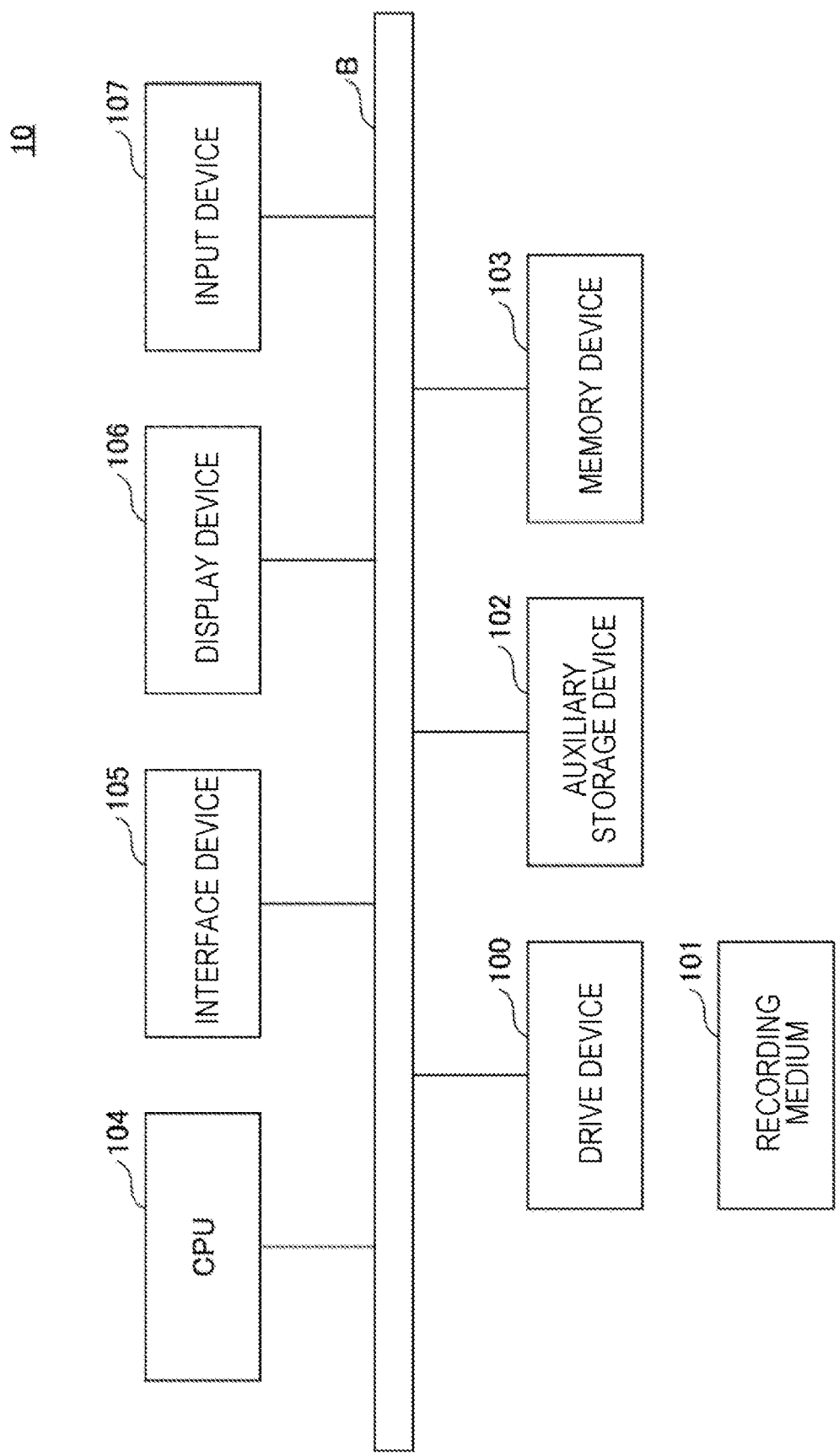
FIG. 2 is a diagram illustrating a hardware configuration example of a dialogue replay apparatus 10 according to an embodiment of the present invention.

FIG. 2 is a diagram illustrating a hardware configuration example of the dialogue replay apparatus 10 according to an embodiment of the present invention. The dialogue replay apparatus 10 in FIG. 2 includes a drive device 100, an auxiliary storage device 102, a memory device 103, a CPU 104, an interface device 105, a display device 106, an input device 107, and the like, which are connected to one another via a bus B.

A program for realizing processing in the dialogue replay apparatus 10 is provided by a recording medium 101 such as a CD-ROM. When the recording medium 101 storing the program is set in the drive device 100, the program is installed on the auxiliary storage device 102 from the recording medium 101 via the drive device 100. However, the program is not necessarily installed from the recording medium 101, and may be downloaded from another computer via a network. The auxiliary storage device 102 stores the installed program and also stores necessary files, data, and the like.

In a case where an instruction to start the program is received, the memory device 103 reads out and stores the program from the auxiliary storage device 102. The CPU 104 implements a function related to the dialogue replay apparatus 10 in accordance with a program stored in the memory device 103. The interface device 105 is used as an interface for connecting to a network. The display device 106 displays a GUI (Graphical User Interface) or the like by the program. The input device 107 is constituted by a keyboard and a mouse, for example, and is used to input various operation instructions.

Figure 3:
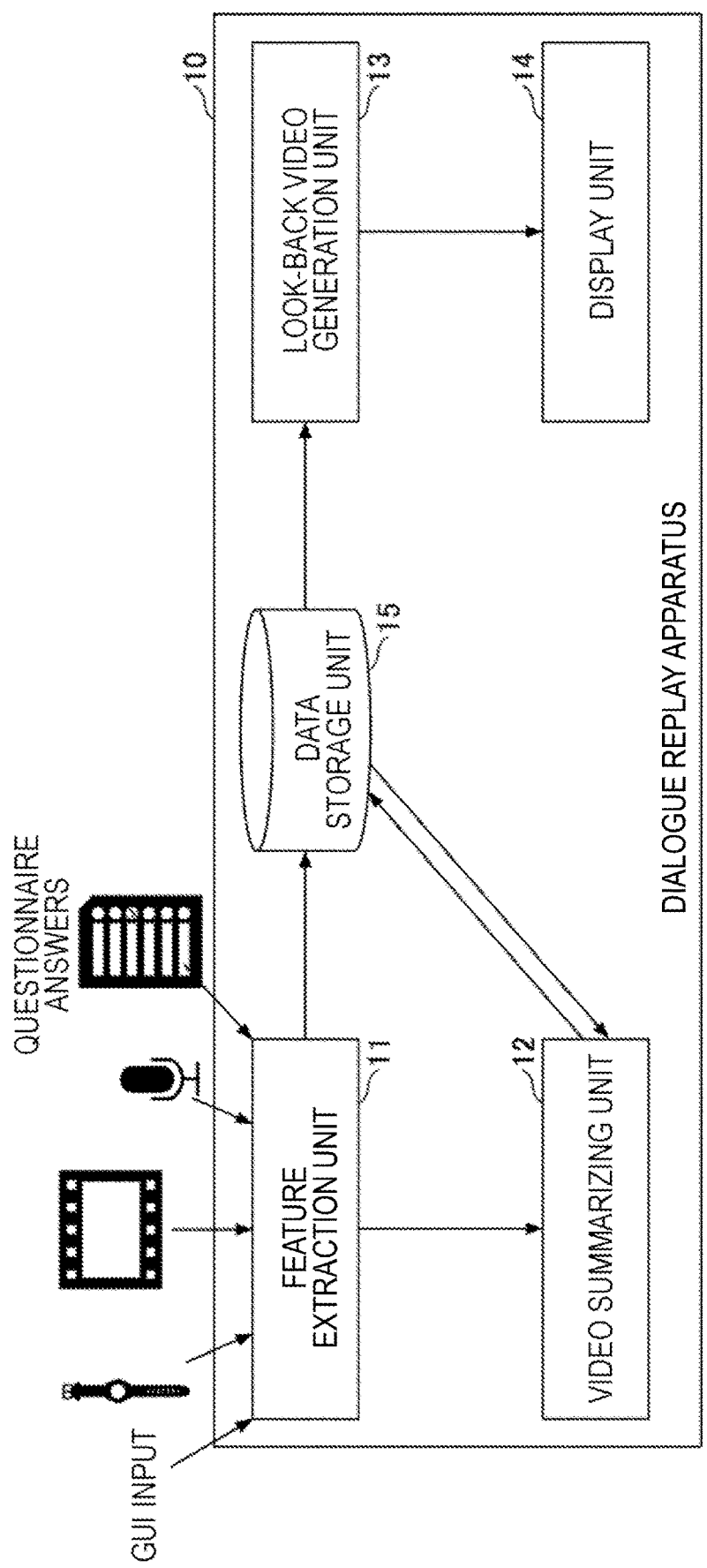
FIG. 3 is a diagram illustrating a functional configuration example of the dialogue replay apparatus 10 according to the embodiment of the present invention.

FIG. 3 is a diagram illustrating a functional configuration example of the dialogue replay apparatus 10 according to the embodiment of the present invention. In FIG. 3, the dialogue replay apparatus 10 includes a feature extraction unit 11, a video summarizing unit 12, a look-back video generation unit 13, and a display unit 14. Each of these units is implemented by processing that one or more programs installed in the dialogue replay apparatus 10 cause the CPU 104 to execute. The dialogue replay apparatus 10 also uses a data storage unit 15. The data storage unit 15 can be implemented by using, for example, the auxiliary storage device 102 or a storage device connectable to the dialogue replay apparatus 10 via a network.

Note that the dialogue replay apparatus 10 may not include the video summarizing unit 12. That is, the video data described below may not be summarized.

Hereinafter, processing executed by each unit will be described.

[Feature Extraction Unit 11]

For example, after the end of a dialogue or during a dialogue, the feature extraction unit 11 receives video data of the dialogue (time series data of the video output to a terminal of any one of the participants (a shared video and a participant video in FIG. 1), time series data of an audio of the dialogue, and one or more other time series input data. Note that the time series data of a video is hereinafter referred to as "video data". The audio time series data is hereinafter referred to as "audio data". The other pieces of time series input data are hereinafter referred to as "time series input data".

The time series input data is data having time information that can be associated (synchronized) with time information such as a time stamp of the video data or the audio data. Although it is assumed that the time series input data is mainly data acquired during the dialogue, data having time information prepared in advance may be the time series input data.

The time series input data refers to, in addition to a video and an audio, time series data of numerical values that is changeable according to a train of thought of a participant. Examples of the time series input data that can be considered include: (a numerical value indicating) a time series pulse of each participant measured during a dialogue by a wristwatch-type pulse wave meter as an example of using equipment; (a numerical value indicating) a time series electromyography (EMG) and (a numerical value indicating) a time series electroencephalogram (EEG) measured during a dialogue by using an eye tracker or a device capable of performing measurement for EMG and EEG; data (numerical value) randomly input in time series for predetermined one or more items by the participant himself or herself using an input device such as a mouse or a keyboard during a dialogue; and data (numerical value) in which a third party (a person other than the participant) views a video of a dialogue after the end of the dialogue and randomly inputs one or more predetermined items in time series using an input device such as a mouse or a keyboard. As an example of the predetermined item, for example, an item indicating the train of negative thought that is difficult to express in a dialogue, such as "sometimes the dialogue content could not be understood", an item indicating the train of positive thought, such as "interesting" or "empathy" can be considered. Any item may be considered as long as it can express a feeling felt from a dialogue, and data that can be output as a numerical value, such as input with a Likert scale, is used. In addition, a value having the same time information may be extracted from a plurality of items, and one numerical value output by a predetermined function having the plurality of items as inputs may be used as the time series input data.

The feature extraction unit 11 synchronizes a timing (time) of all the received data (video data, audio data, and time series input data). As a method of synchronizing video data and audio data, for example, a method disclosed in JP 2020-198510 A may be used. For example, in a case where video data is set as a master (hereinafter, data selected as the master is referred to as "master data"), the time series data may be synchronized in the form in which an offset of a time stamp of the audio data or the time series input data is measured with respect to the video data, and the measured offset is given to the time stamps of the audio data and the time series input data (the time stamp is changed by the measured offset).

Next, the feature extraction unit 11 extracts, for each participant, a feature whose value is changeable according to the train of thought of the participant from the synchronized data.

In the case of the video data, it is desirable to extract a feature appearing as an influence received from the dialogue and a feature affecting the dialogue, for each participant in the dialogue. For example, a feature expressing an expression, a body motion, or the like of each participant can be considered. Any known method such as a method using an API such as OpenFace may be used, for example, to extract the feature of the expression or the body motion.

In the case of the audio data, similarly, it is desirable to extract a feature appearing as an influence received from the dialogue and a feature affecting the dialogue, for each participant. For example, a magnitude or a pattern of a sound pressure of an audio waveform of each participant is considered. A sound pressure equal to or higher than/equal to or lower than a predetermined threshold for the time series sound pressure for each participant may be extracted as the feature for each participant, or a portion (sound pressure waveform) where a pattern of a preset sound pressure waveform appears in the time series sound pressure for each participant may be extracted as the feature for each participant.

In the case of the time series input data, similarly, a value appearing as an influence received from the dialogue may be extracted for each participant, or a value of a portion where an input using an input device such as a mouse or a keyboard is made is equal to or higher than a certain threshold may be extracted for each participant as the feature. For example, in the time series input data, a value equal to or higher than/equal to or lower than a predetermined threshold may be extracted as the feature for each participant, or in the input time series data, a portion in which a preset time series change pattern appears may be extracted as the feature for each participant.

Furthermore, the feature extraction unit 11 may cause some CNN model of machine learning to learn one or more of the above-listed features, and extract one or more output values as features to be used in the subsequent processing. The CNN model is not limited to a specific one, and for example, the CNN model may be caused to learn time series change information of a value such as an Action Unit output by an API such as OpenFace and correct answer data on what kind of expression the value indicates. For example, by causing CNN to learn a combination of one or more Action Units indicating expressions such as joy, anger, sorrow, and pleasure and a value of a time series change of the combination, for the time series feature of the participant, data output in time series of the values of the Action Unit using OpenFace may be input to the learned CNN, and the values of joy, anger, sorrow, and pleasure may be output as the output, for each participant. The output value may be used as a feature to be utilized as the subsequent processing.

The feature extraction unit 11 associates various features F(t) obtained for each participant with an ID (hereinafter, referred to as a "feature ID") for identifying a type of each feature F(t). Note that t is a variable representing the time during a dialogue. Therefore, the feature F(t) indicates the feature at the time t. Further, for example, the feature extraction unit 11 associates a weight w (weight that can be set for each participant) stored in a DB in advance for each feature ID with each feature F(t) on the basis of the feature ID. The feature extraction unit 11 also stores various features F(t) associated with the respective features ID, the master data, and time information of the master data, in the data storage unit 15. However, the weight w may be set by a user at the time of extraction of the feature. In a case where the weight w is set at the time of extraction of the feature, the set weight w is associated with the feature ID at the time of setting the weight w.

Next, the feature extraction unit 11 calculates a feature FA(t) of all the participants for each ID. In a case where the weight that can be set for each participant is w, FA(t) is calculated as follows.

$$FA(t)=F1(t)*w1+F2(t)*w2+F3(t)*w3+F4(t)*w4 \text{ (for four participants)}$$

Note that FN(t) (here, N=1 to 4) indicates the feature of the participant N at the time t. wN represents a weight for the participant N.

The feature extraction unit 11 further stores various features FA(t) associated with the respective features D in the data storage unit 15.

Furthermore, as the feature for calculating the feature FA(t), answers of each participant to a questionnaire regarding impressions regarding a dialogue can also be utilized. The feature extraction unit 11 may shape one or more answers including information that can be associated with time information of the master data as time series data having time information, and utilize the time series data as a feature. For example, in a case where there is an answer of "it was fun until the topic of ○○ appeared", a value of the feature related to the time series data may be changed between before the topic appears and after the topic appears in the time series data.

In addition, the questionnaire answers may be reflected in the weight w. For example, in a case where a personality such as not showing much emotion is read from the result of the questionnaire, it is conceivable to set the weight w of that person to be more than other participants by a certain value.

[Video Summarizing Unit 12]

The video summarizing unit 12 summarizes the video data. The summary of the video data refers to extracting video data of one or more partial sections from the video data and connecting the video data. The video data may be summarized using a known method as disclosed in Patent Literature 1.

The video summarizing unit 12 may utilize the predetermined feature FA(t) extracted by the feature extraction unit 11. For example, the video summarizing unit 12 may summarize the video data by connecting partial sections of the video data in which a predetermined FA(t) is equal to or higher than a threshold.

Furthermore, in a case where a predetermined feature F(t) extracted for each participant is used, the video summarizing unit 12 performs the behaviors of paragraph [0033] to paragraph [0036] for each participant in a digest video generation unit 14 described in Patent Literature 1. That is, the video section after the summarizing is selected such that a total time becomes substantially equal to the video time input as a parameter using the feature extracted for each participant. In a case where a given feature F(t) extracted for each participant is used, in a case where there are four participants, there are four patterns of video sections after the selection. The video summarizing unit 12 selects partial videos included in any of the four patterns from partial videos having a large linear sum of features, and in a case where a difference between the total time and the video time is equal to or lower than a predetermined value, proceeds to step S109 described in Patent Literature 1, and generates summary video data. Accordingly, it is possible to perform summarization in which the features of each participant are equally treated.

The video summarizing unit 12 stores the generated summary video data in the data storage unit 15. The video summarizing unit 12 also converts the time (time stamp) of the feature F(t) or the feature FA(t) at the time t included in the summary video data among the times t on a time axis of the video data before summarization into the time information on the time axis of the summary video data. That is, a new time is set for the time series of the feature F(t) or the feature FA(t) generated by connecting the feature F(t) or the feature FA(t) of the time section included in the summary video data among the features F(t) or the features FA(t).

[Look-Back Video Generation Unit 13]

The look-back video generation unit 13 receives the video data recorded during a dialogue, or the summary video data (hereinafter, both cases are referred to as "target video data") in a case where the video data is summarized by the video summarizing unit 12, acquires the feature F(t) or the feature FA(t) corresponding to the target video data from the data storage unit 15, and generates the video data (hereinafter, referred to as "look-back video data") in which the feature is visualized (on which the information indicating the feature is superimposed) with respect to the target video data.

The look-back video generation unit 13 sets one or more features (F(t) or FA(t)) as display targets, and receives a setting from a user or the like as to what kind of visualization method is used to display the feature of the display target (which feature is displayed in which form (format)). In the visualization method, for example, various visualizations can be set using a library such as D3.js.

The look-back video generation unit 13 also receives a setting from a user or the like as to where to display each feature of the display target on a visualized video. For example, in a case where a certain feature F(t) is set as the display target, since the feature F(t) is extracted for each participant, the look-back video generation unit 13 accepts the setting for arrangement places for all the participants. For example, in a case where it is assumed that the feature F(t) is displayed on the display device 106, information of an x coordinate and a y coordinate as arrangement places, and vertical and horizontal pixel values as size information of an area on which the feature F(t) is displayed are set for each participant. In a case where the feature FA(t) is set as the display target, the arrangement place is similarly set. However, in the case of the feature FA(t), setting for each participant is unnecessary.

The visualization method and the setting of the arrangement place of the feature may be performed by preparing one or more sets of the setting of the visualization method and the setting of the arrangement place of the feature (x, y coordinates, and vertical and horizontal pixel values) and allowing selection from the sets.

The feature which is set as the display target may be changed in the middle of the time series of the video data. In the case of changing, a change portion can also be set in advance before generation of the look-back video data. Furthermore, it is also possible to receive and change some input during video replay.

Based on the above setting, the look-back video generation unit 13 generates, for the target video data, the look-back video data in which the feature selected as the display target is visualized at a position selected by the selected visualization method.

[Display Unit 14]

The display unit 14 displays, on the display device 106, a screen (hereinafter, referred to as a "replay screen") for reproducing the look-back video data generated by the look-back video generation unit 13.

Figure 4:
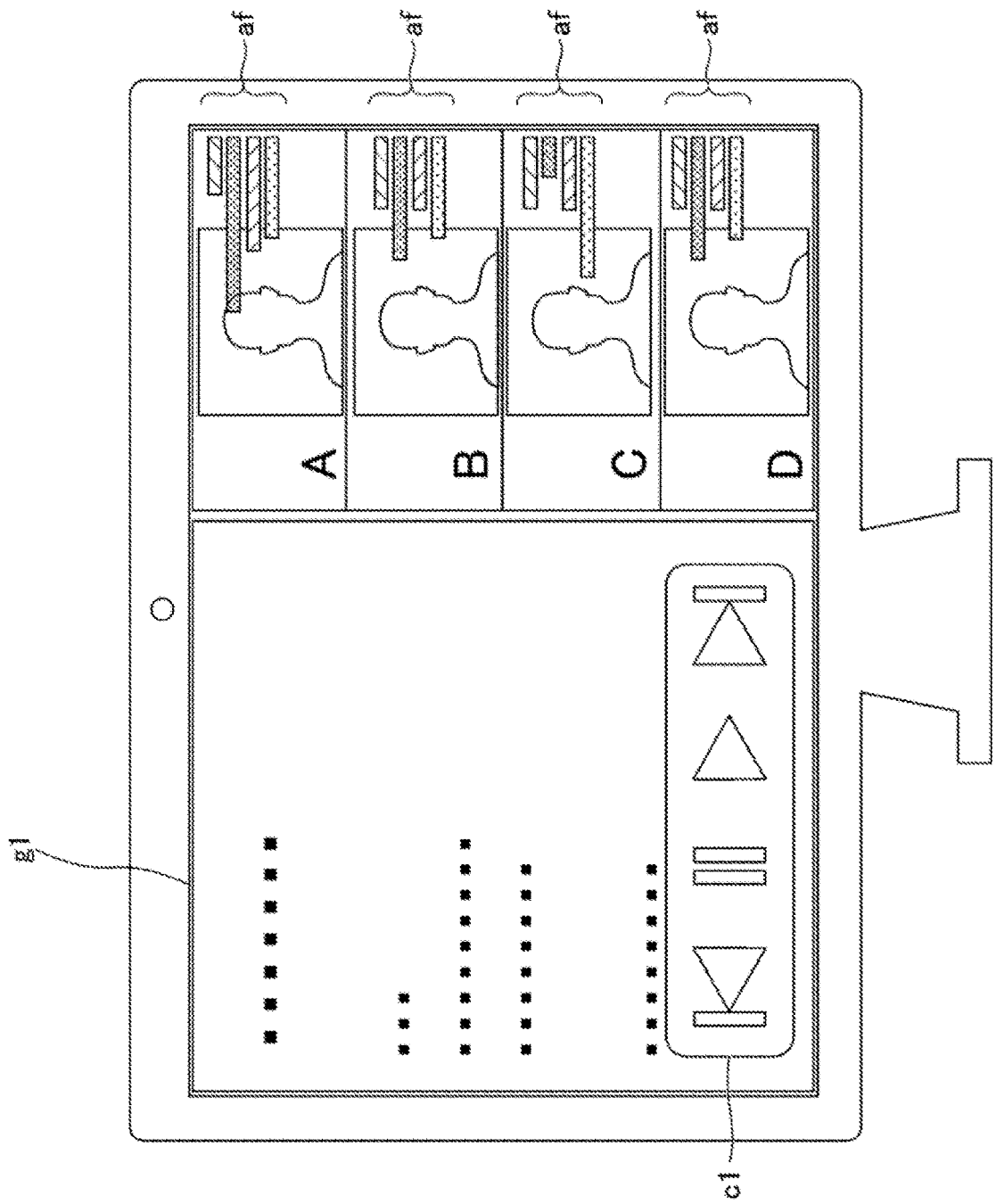
FIG. 4 is a diagram illustrating a display example of a replay screen.

FIG. 4 is a diagram illustrating a display example of the replay screen. As illustrated in FIG. 4, a replay screen g1 is a screen including a controller c1 together with a replay region of the look-back video data.

In the look-back video data, a feature display area af for displaying the feature of each participant in synchronization with the video is superimposed for each of participants A to D. In the example of FIG. 4, an example in which four types of features are set as display targets is illustrated.

The controller c1 includes, for example, a button for receiving replay, pause, and the like. When the replay button is pressed, the display unit 14 reproduces the look-back video data. When the pause button is pressed, the display unit 14 pauses the replay of the look-back video data. Note that, in a case where a terminal of each participant is used as the dialogue replay apparatus 10, each participant can operate the controller c1, but since the look-back video data is reproduced in synchronization with all the participants, when anyone presses the pause button, the replay of all the participants is paused at the same place. Each participant can have a conversation with another participant by pressing a pause button in a case where there is a content that the participant wants to say while browsing the look-back video data.

As described above, according to the present embodiment, at the time of reproducing the video data of a dialogue, a feature indicating the train of thought of a participant in the dialogue can be synchronously displayed. Therefore, it is possible to ascertain the train of thought of a participant in a dialogue. Moreover, the dialogue itself can be viewed from the viewpoint of a third party. As a result, for example, it is possible to look back on the detailed train of thought of each participant, ideas popped into thought, a part of a dialogue which a small number of persons or one person considers to be important, and enable the participant to view the dialogue itself from a third-party perspective like bird's-eye view.

Note that, in the present embodiment, the feature extraction unit 11 is an example of an extraction unit. The look-back video generation unit 13 is an example of a generation unit. The display unit 14 is an example of a display unit. The look-back video data is an example of display data.

Although the embodiment of the present invention has been described in detail above, the present invention is not limited to such specific embodiment, and various modifications and changes can be made within the scope of the gist of the present invention described in the claims.

REFERENCE SIGNS LIST

10 Dialogue replay apparatus
11 Feature extraction unit
12 Video summarizing unit
13 Look-back video generation unit
14 Display unit
15 Data storage unit
100 Drive device
101 Recording medium
102 Auxiliary storage device
103 Memory device
104 CPU
105 Interface device
106 Display device
107 Input device
B Bus

The invention claimed is:

1. A dialogue replay method, comprising:
   causing a computer to execute:
   extracting time series data of various types of features for each participant of a plurality of participants in a dialogue from time series data regarding the dialogue, a value of which is changeable according to a train of thought of the each participant in the dialogue;
   calculating a sum of the features for the plurality of participants in an identified type of the features, with the features being weighted respectively for the plurality of participants;
   generating display data visualizing the time series data of the sum of the features together with a video of the dialogue in synchronization with a time of the video; and
   displaying the display data.

2. The dialogue replay method according to claim 1, wherein
   the computer executes summarizing the video based on a feature of the each participant, and
   the generating the display data generates the display data visualizing the time series data of the sum of the features together with the summarized video in synchronization with a time of the summarized video.

3. A non-transitory computer-readable storage medium storing a program causing a computer to execute the dialogue replay method according to claim 2.

4. A non-transitory computer-readable storage medium storing a program causing a computer to execute the dialogue replay method according to claim 1.

5. A dialogue replay apparatus, comprising:
   a processor; and
   a memory storing one or more programs, which when executed, cause the processor to execute:
   extracting time series data of various types of features for each participant of a plurality of participants in a dialogue from time series data regarding the dialogue, a value of which is changeable according to a train of thought of the each participant in the dialogue;
   calculating a sum of the features for the plurality of participants in an identified type of the features, with the features being weighted respectively for the plurality of participants;
   generating display data visualizing the time series data of the sum of the features together with a video of the dialogue in synchronization with a time of the video; and
   displaying the display data.

6. The dialogue replay apparatus according to claim 5, wherein
   the processor is caused to execute summarizing the video based on a feature of the each participant,
   wherein the generating the display data generates the display data visualizing the time series data of the sum of the features together with the summarized video in synchronization with a time of the summarized video.

\* \* \* \* \*